United States Patent
Schober et al.

(10) Patent No.: US 7,586,243 B2
(45) Date of Patent: Sep. 8, 2009

(54) METHODS AND SYSTEMS FOR IMPROVING OPTICAL FLATNESS IN A PATH LENGTH CONTROL DRIVER

(75) Inventors: Christina M. Schober, Saint Anthony, MN (US); Daniel J. Murray, Mahtomedi, MN (US); Danielle D. Oscarson, Stillwater, MN (US); Robert R. Divine, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/129,430

(22) Filed: May 29, 2008

(65) Prior Publication Data

US 2008/0225418 A1 Sep. 18, 2008

Related U.S. Application Data

(62) Division of application No. 11/046,242, filed on Jan. 28, 2005, now Pat. No. 7,382,463.

(51) Int. Cl.
*H01L 41/083* (2006.01)
(52) U.S. Cl. .................. 310/365; 310/328; 310/331; 310/366; 356/469
(58) Field of Classification Search .............. 310/311, 310/328, 330, 331, 365, 366; 356/350, 459, 356/473, 469; 372/94
See application file for complete search history.

(56) References Cited

U.S. PATENT DOCUMENTS

| | | | |
|---|---|---|---|
| 4,160,184 A | 7/1979 | Ljung | |
| 4,969,726 A | 11/1990 | Koning | |
| 5,108,182 A | 4/1992 | Murphy | |
| 5,116,128 A | 5/1992 | Hall et al. | |
| 5,116,131 A | 5/1992 | Farahani et al. | |
| 5,148,076 A | 9/1992 | Albers et al. | |
| 5,311,280 A | 5/1994 | Koper et al. | |
| 5,335,063 A | 8/1994 | Karpinski, Jr. | |
| 5,371,589 A | 12/1994 | Martin | |
| 5,376,859 A | 12/1994 | Kim et al. | |
| 5,406,048 A | 4/1995 | Yamazaki et al. | |
| 5,469,258 A | 11/1995 | Grasso | |
| 5,838,440 A | 11/1998 | Beaudet | |
| 5,954,700 A | 9/1999 | Kovelman | |
| 6,354,964 B1 | 3/2002 | Galbrecht et al. | |
| 6,459,487 B1 | 10/2002 | Chen et al. | |
| 6,476,918 B1 | 11/2002 | Killpatrick | |
| 6,515,403 B1 | 2/2003 | Schober et al. | |
| 7,382,463 B2 * | 6/2008 | Schober et al. | 356/469 |
| 2003/0015944 A1 * | 1/2003 | Schober et al. | 310/366 |
| 2004/0169865 A1 | 9/2004 | Schober | |

FOREIGN PATENT DOCUMENTS

EP 0293528 A1 12/1988
EP 0508391 A2 10/1992

\* cited by examiner

*Primary Examiner*—Thomas M Dougherty
(74) *Attorney, Agent, or Firm*—Fogg & Powers LLC

(57) ABSTRACT

A piezoelectric transducer is described that is configured for use within a path length control apparatus of an optical device. The transducer comprises at least one void formed within a central region of the piezoelectric transducer, the one void or alternatively, the multiple voids, utilized at least in part to limit a curvature induced into a mirror during operation of the piezoelectric transducer.

7 Claims, 4 Drawing Sheets

METHODS AND SYSTEMS FOR IMPROVING OPTICAL FLATNESS IN A PATH LENGTH CONTROL DRIVER

PRIORITY CLAIM

This patent application claims priority from U.S. patent application Ser. No. 11/046,242 filed Jan. 28, 2005, and entitled, "Methods and Systems for Improving Optical Flatness in a Path Length Control Driver," now issued as U.S. Pat. No. 7,382,463, the contents of which are hereby incorporated by reference in its entirety.

BACKGROUND OF THE INVENTION

This invention relates generally to a path length control apparatus (PLC) for optical devices, and more specifically, to a PLC apparatus that includes an improved surface for reflecting laser beams within a ring laser gyroscope (RLG).

A ring laser gyroscope (RLG) is commonly used to measure the angular rotation of an object, such as an aircraft. Such a gyroscope has two counter-rotating laser light beams that propagate within a closed loop optical path or "ring" with the aid of successive reflections from multiple mirrors. The closed path is defined by an optical cavity that is interior to a gyroscope frame or "block." In one type of RLG, the block includes planar top and bottom surfaces that are bordered by six planar sides that form a hexagon-shaped perimeter. The block is sometimes referred to as a laser block assembly. Three planar non-adjacent sides of the block form the mirror mounting surfaces for three mirrors at the corners of the optical path, which is triangular in shape.

Operationally, upon rotation of the RLG about its input axis (which is perpendicular to and at the center of the planar top and bottom surfaces of the block), the effective path length of each counter-rotating laser light beam changes. A frequency differential is produced between the beams that is nominally proportional to angular rotation. This differential is then optically detected and measured by signal processing electronics to determine the angular rotation of the vehicle. To maximize the signal out of the RLG, the path length of the counter-rotating laser light beams within the cavity must be adjusted. Thus, RLGs typically include a path length control apparatus (PLC), the purpose of which is to control the path length for the counter-rotating laser light beams to maximize the output signal.

Such PLCs typically include a piezoelectric transducer (PZT) secured to a mirror that is in turn secured to a mirror mounting surface of the laser block assembly (LBA). The mirror is in communication with bores in an optical cavity of the LBA. The bores form a portion of the closed loop optical path or ring defined by the optical cavity. The mirror reflects the counter-rotating laser light beams at its respective corner of the closed loop optical path. As such, a flatness of the mirror can affect the reflection of the counter-rotating laser light beams and thus operation of the RLG.

SUMMARY OF THE INVENTION

In one aspect, a piezoelectric transducer configured for use within a path length control apparatus of an optical device is provided. The transducer comprises at least one void formed within a central region of the piezoelectric transducer. The single void, or alternatively the multiple voids, are utilized at least in part, to limit a curvature induced into a mirror during operation of the piezoelectric transducer.

In another aspect, a method for limiting an amount of curvature induced into a mirror during operation of a piezoelectric device attached to the mirror is provided. The piezoelectric device includes one or more piezoelectric layers adjacently stacked and the process comprises forming a void through a central region of at least the piezoelectric layer adjacent the mirror and attaching a non-piezoelectric stiffening block to the mirror within the void.

In still another aspect, a method for limiting an amount of curvature induced into a mirror during operation of a piezoelectric device attached to the mirror is provided. The piezoelectric device includes one or more piezoelectric layers and the method comprises coating a surface of at least one of the piezoelectric layers with an electrode material, the electrode material having a void formed therein adjacent a central region of the respective piezoelectric layer, and forming a stack of piezoelectric layers, the one or more coated surfaces substantially parallel to a reflective surface of the mirror.

In yet another aspect, a ring laser gyroscope is provided that comprises a laser block assembly, a mirror, and a piezoelectric transducer. The laser block assembly comprises an optical path bored therein and the mirror comprises a reflective surface and a non-reflective surface. The reflective surface is attached to the laser block assembly and in optical communication with the optical path. The piezoelectric transducer is attached to the non-reflective surface of the mirror, and comprises at least one void located in a central region of the piezoelectric transducer. The void is configured to limit a curvature induced into the mirror during operation of the piezoelectric transducer.

In another aspect, a path length control apparatus for a ring laser gyroscope is provided that comprises a mirror comprising a reflective surface and a non-reflective surface and a piezoelectric transducer. The reflective surface is configured for attachment to a laser block assembly of the ring laser gyroscope and the piezoelectric transducer is attached to the non reflective surface of the mirror. The piezoelectric transducer comprises at least one void located in a central region of the piezoelectric transducer and the at least one void is configured to limit a curvature induced into the mirror during operation of the path length control apparatus.

DETAILED DESCRIPTION OF THE PREFERRED EMBODIMENT

Figure 1:
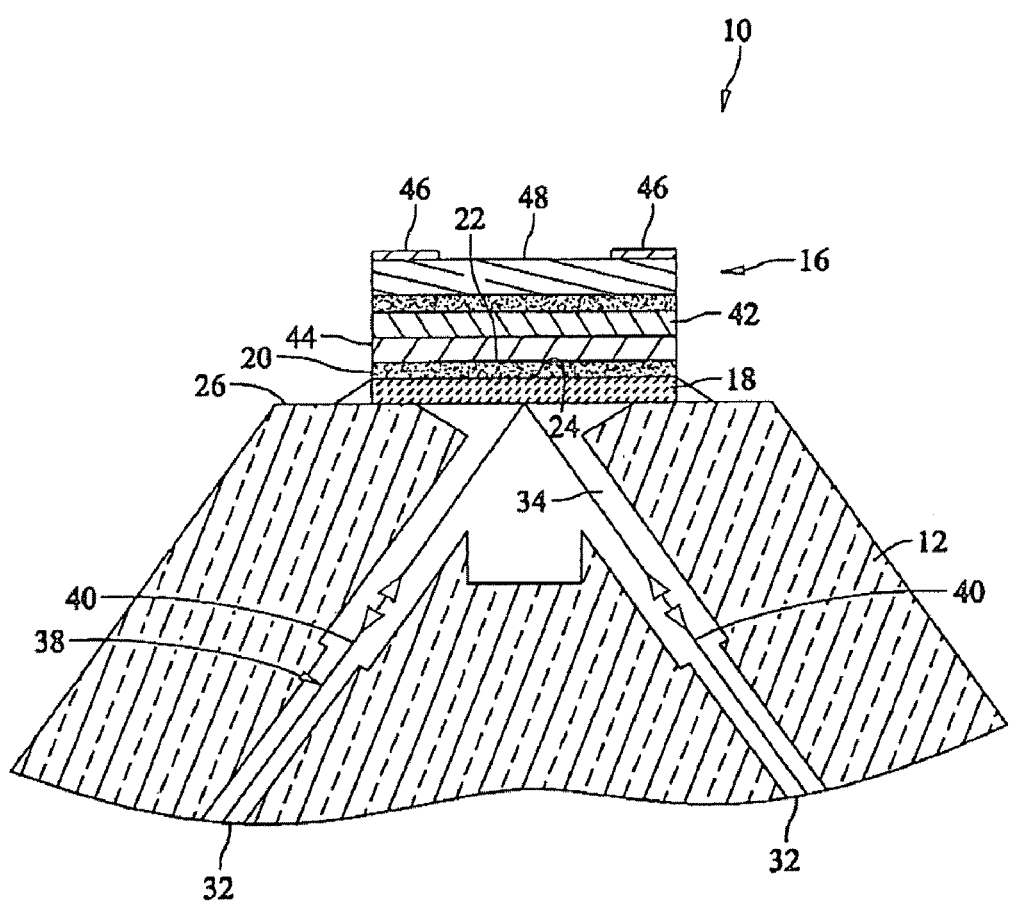
FIG. 1 is a cross-sectional view of a path length control apparatus, including a piezoelectric transducer, that is attached to a laser block assembly.

FIG. 1 illustrates a path length control (PLC) apparatus 10 attached to a laser block assembly (LBA) 12 of a ring laser gyroscope (RLG). PLC apparatus 10 includes a piezoelectric transducer (PZT) 16 which is secured to a mirror 18 via an epoxy-based adhesive 20. Epoxy adhesive 20 covers the interface (defined by a lower surface 22 of PZT 16 and an upper surface 24 of mirror 18) between PZT 16 and mirror 18. Mirror 18 is secured to a mirror mounting surface 26 of LBA 12. Mirror 18 is configured for communication with laser bores 32 within an optical cavity 34 of LBA 12. Bores 32 form a portion of a closed loop optical path 38 defined by the optical cavity 34.

As illustrated by FIG. 1, mirror 18 reflects counter-rotating laser light beams 40 at a respective corner of the closed loop optical path 38. PZT 16 includes at least a pair of piezoelectric elements, or layers, 42 and 44. A plurality of piezoelectric layers, for example piezoelectric elements 42 and 44, are sometimes collectively referred to as a piezoelectric device. PZT 16 utilizes a voltage applied to piezoelectric elements 42 and 44 and delivered by a regulated voltage source (not shown) which is attached to contacts 46. Contacts 46 are electrically connected to piezoelectric elements 42 and 44. Regulation of the applied voltage is in response to a signal provided by a detector (not shown) that monitors the intensity of the light beams 40. Application of the applied voltage results in small, but precisely controlled, mechanical movements of piezoelectric elements 42 and 44 in a direction perpendicular to a top surface 48 of PZT 16. This mechanical movement of piezoelectric elements 42 and 44 of PZT 16 affects translational movement of mirror 18, and thereby controls the path length of the laser light beam 40 (e.g., a length of closed loop optical path 38).

Figure 2:
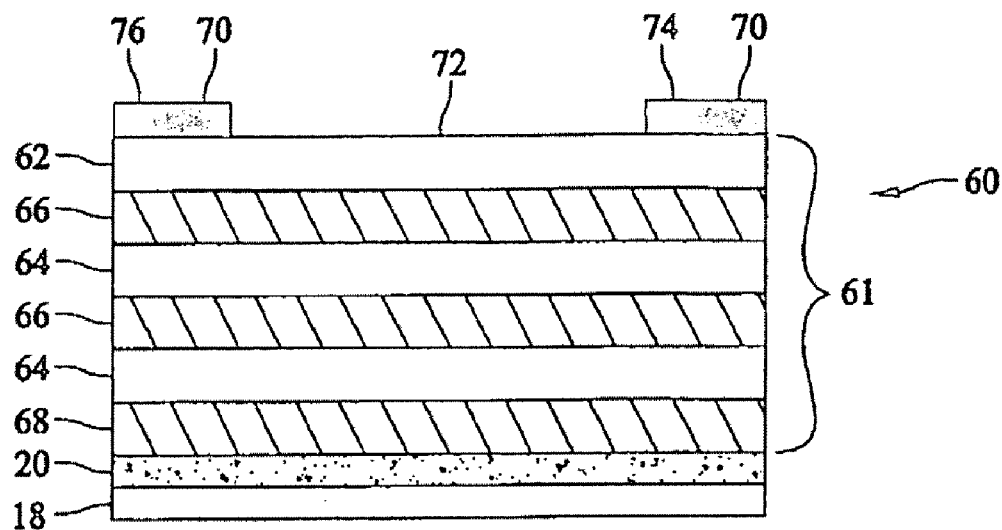
FIG. 2 is a cross-sectional view of one embodiment of piezoelectric transducer.

FIG. 2 is a cross-sectional view of a multi-layered PZT 60, which includes a stack 61 of alternating negative and positive co-fired ceramic piezoelectric layers. Co-fired ceramic piezoelectric layers are layers that are "fired" together when they are fabricated, as opposed to being fabricated separately and then later bonded together in a multi-layered stack. Multi-layered PZT 60 may include, for example, a top layer 62, a bottom layer 68, and alternating negative 64 and positive 66 layers therebetween. Multi-layer PZT 60 also includes contacts 70, which are electrically connected to one or more of the above described layers within multi-layer PZT 60. Such contacts are typically formed directly on top layer 62 of PZT 60. A regulated voltage source can be coupled directly to PZT 60 utilizing contacts 70 on top layer 62. Multi-layer PZT 60 therefore includes a plurality of ceramic layers including top layer 62, negative layers 64, positive layers 66, and bottom layer 68 so as to form a stack 61 in which each ceramic layer has first and second opposing surfaces.

In one embodiment, top layer 62 includes a top conductive pattern formed on its first surface 72. The top conductive pattern includes a negative contact 74 and a positive contact 76. Bottom layer 68 also includes a conductive pattern formed on its first surface. Layers 64 and 66 each include alternating conductive patterns formed on the first surface thereof. In such a multi-layer configuration, the co-fired ceramic layers 62, 64, 66, 68 are more tightly coupled to mirror 18 since they lack an epoxy layer between each ceramic layer. Therefore, almost all of the distortion in the ceramic stack 61 is directly imparted into mirror 18.

Sometimes, with conventional PZTs, for example, PZT 16 and multi-layered PZT 60, in which the PLC driver is bonded directly to the transducer mirror, curvature in the mirror due to stresses or other factors may cause multi-moding of the laser beam that is directed towards (and reflected from) mirror 18. In multi-layered PZT 60, this multi-moding occurs more often, for example, in approximately 30-50% of the laser block assemblies which utilize a PZT similar to PZT 60. This is particularly true, for example, because only thin layers 20, for example, from about 0.0005" to about 0.001" of epoxy are typically used to attach the mirror 18 to the driver. This multi-moding interferes with the laser mode that the LBA 12 uses to get accurate count data (and therefore navigation data).

Figure 3:
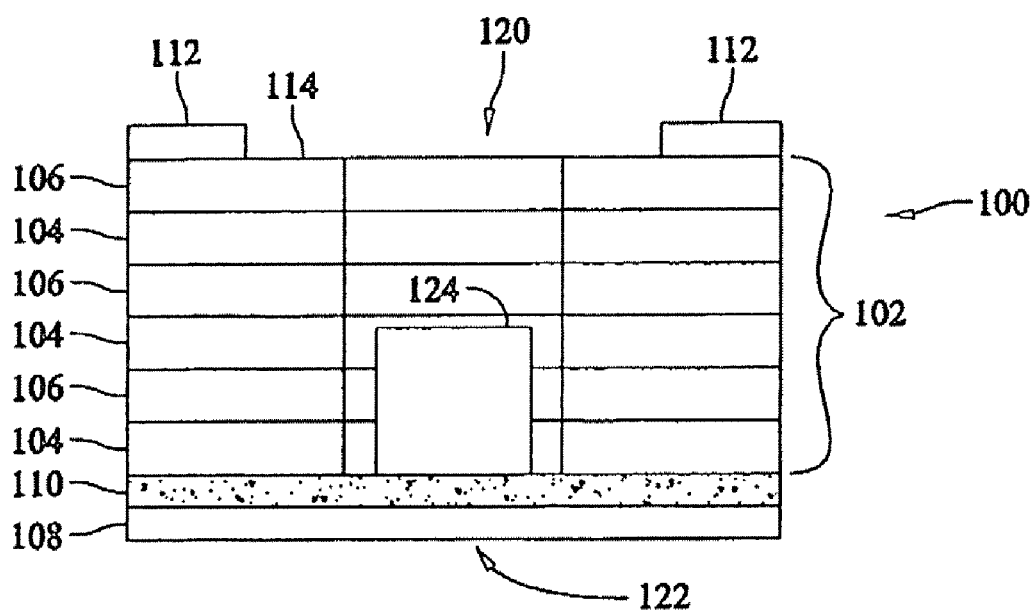
FIG. 3 is a cross-sectional view of a piezoelectric transducer which includes voids formed therein.

FIG. 3 is a cross-sectional view multi-layered PZT 100, which includes a stack 102 of alternating negative and positive co-fired ceramic piezoelectric layers, 104 and 106 respectively, attached to mirror 108 with a layer of epoxy 110. Contacts 112 attached to top layer 114 operate similarly to contacts 70 (shown in FIG. 2) as described above. Although not shown in FIG. 3, piezoelectric layers 104 and 106 include having alternating conductive patterns formed on their top surfaces providing a mechanism for electrical contact with contacts 112.

While generally similar to PZT 60 (shown in FIG. 2 and described above), ceramic layers 104 and 106 of PZT 100 each include a void 120 or hole formed therethrough. Void 120 is roughly centered at a position generally co-linear to a perpendicular of the mirror and within an area 122 where a laser beam strikes mirror 108. In one embodiment, void 120 is circular in shape and therefore, ceramic layers 104 and 106 have a shape similar to a washer. In other embodiments (not shown), the void is configured in other geometric shapes, including, but not limited to, a square, a rectangle, and an oval. Area 122 is sometimes referred to as a critical region. Within void 120 is a block 124 of non-piezoelectric material that is also bonded to mirror 108 with epoxy 110. By bonding block 124 to mirror 108, area 122 of mirror 108 is constrained to retain a surface with an improved flatness as compared to mirrors within known PZTs, for example PZTs 16 and 60.

Figure 4:
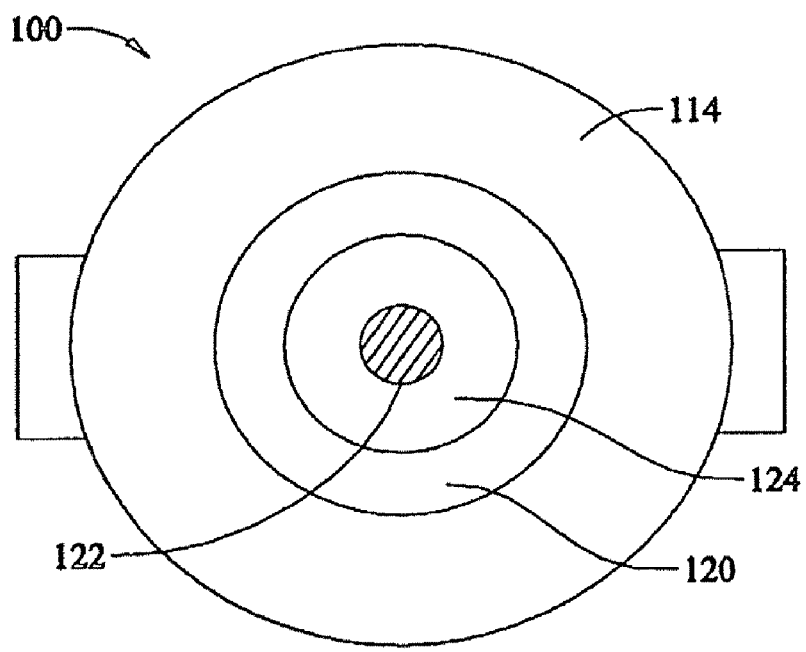
FIG. 4 is a top view of the piezoelectric transducer of FIG. 3.

The bonded non-piezoelectric material (e.g., block 124) acts through the bond of epoxy 110 to distribute stresses placed on mirror 108 by changes in temperature and voltage, for example, from mirror to block 124. A surface area of block 124, in one embodiment, is greater than area 122 since stress concentrations are greatest at a perimeter of block 124. Therefore, moving area 122 (the critical region of mirror 108) farther from the perimeter of block 124 (closer to a center of block 124) reduces the effects of the stress concentrations. FIG. 4 is a top view of PZT 100 further illustrating void 120 through top layer 114, non-piezoelectric block 124 and area 122 of mirror 108.

Figure 5:
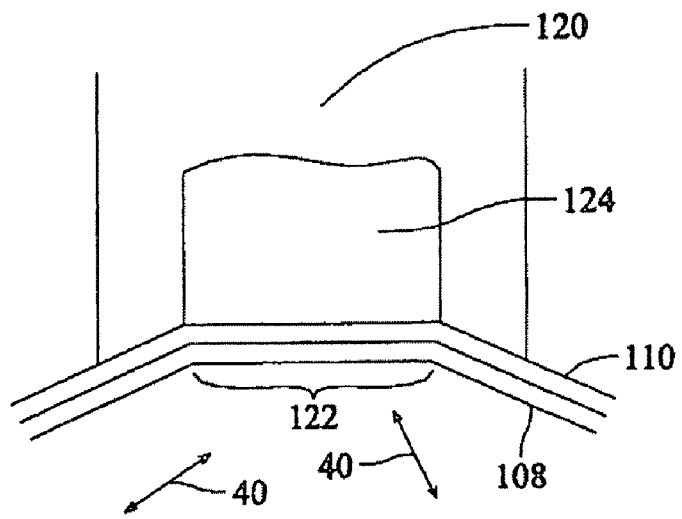
FIG. 5 is a side view illustrating the operation of a non-piezoelectric block placed within the voids of the piezoelectric transducer of FIG. 3, with respect to a mirror of the piezoelectric transducer.

FIG. 5 is a side view of mirror 108, epoxy 110, and block 124 which illustrates the stress distribution of block 124 and the improved flatness of mirror 108 within area 122. The actual dimensions of block 124 and void 120 are dependent on the amount of voltage available and the flexibility (ease of driving the mirror) of mirror 108. However, it is important is that void 120 is of a large enough diameter so that stresses are minimized in area 122 of mirror 108 at which the laser beam 40 reflects and thus minimizes any curvature.

Figure 6:
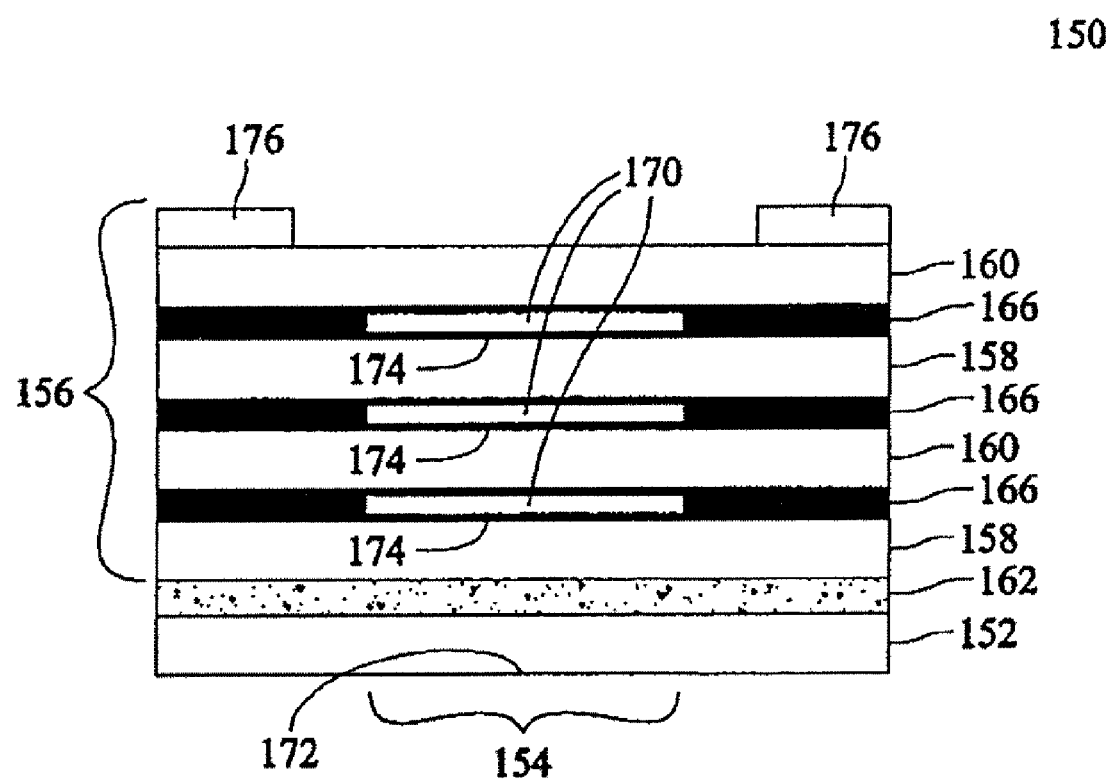
FIG. 6 is a cross-sectional view of another embodiment of piezoelectric transducer.

FIG. 6 is a side view of another embodiment of PZT 150 which is also configured to minimize a flexibility of mirror 152 within an area 154 from which a laser beam reflects. More specifically, PZT 150 includes a stack 156 of alternating negative and positive co-fired ceramic layers, 158 and 160 respectively, attached to mirror 152 with a layer of epoxy 162. On a surface of a number of layers 158 and 160, an electrode material 166 is screen printed thereon. Electrode material 166 is screen printed, in one embodiment, to include a void 170 therein which is larger than a critical region 172 of mirror 152. Voids 170 render unscreened portions 174 of layers 158 and 160 inactive. The inactive portions 174 of layers 158 and 160 do not react to electrical signals applied to electrode material 166 from contacts 176 and therefore act to constrain a flatness of mirror 152 within critical region 172.

As above, the actual dimensions of voids 170 within electrode material 166 are dependent on the amount of voltage available and the flexibility (ease of driving the mirror) of mirror 152. However, and similarly to voids 120 and non-piezoelectric block 124 in PZT 100, it is important is that voids 170 are of a large enough diameter so that stresses are minimized in critical region 172 of mirror 152 at which the laser beam 40 reflects to minimize any curvature The above described embodiments make the path length control (PLC) mirrors for laser devices such as ring laser gyroscopes less susceptible to beam area curvature within the mirrors due to thermal, voltage, and other displacement effects. In one embodiment, a stiffening block 124 is provided behind a critical area 122 of mirror 108 which limits the curvature induced into the mirror by the PLC driver. In this embodiment, a separate material (e.g., stiffening block 124) is located within voids 120 formed in the piezoelectric material, 104 and 106, attached to a back side of mirror 108. In another embodiment, stiffening is provided through a lack of screen printed electrode material 166 (e.g., voids 170) applied to piezoelectric material, 158 and 160. Voids 170 within screen printed material 166 is sometimes referred to as an inactive area within the PLC driver. The inactive area 154 in the ceramic of the piezoelectric driver causes a decoupling of any bending motion within an active area of piezoelectric layers 158 and 160 (e.g., the area that is coated electrode material 166) from the inactive area 154 behind mirror 152.

While PZT 100 and PZT 150 are described as being formed from co-fired ceramic layers, it is to be understood that PZTs which are formed from individual ceramic layers that are bonded together after fabrication, for example, similar to PZT 16 (shown in FIG. 1) may benefit from incorporation of the embodiments described herein. For example, voids may be formed in the ceramic layers and the epoxy utilized to bond the layers together to facilitate insertion of a non-piezoelectric stiffening block within the void and attached to the mirror. Similarly, voids may be formed in the electrode material that is applied to the surface of such ceramic layers, to provide a similar effect on the flexibility of a mirror to which such piezoelectric devices are attached.

While the invention has been described in terms of various specific embodiments, those skilled in the art will recognize that the invention can be practiced with modification within the spirit and scope of the claims.

The embodiments of the invention in which an exclusive property or privilege is claimed are defined as follows:

1. A method for limiting an amount of curvature induced into a mirror during operation of a piezoelectric device attached to the mirror, the piezoelectric device including one or more piezoelectric layers, said method comprising:
   coating a surface of at least one of the piezoelectric layers with an electrode material, the electrode material having a void formed therein adjacent a central region of the respective piezoelectric layer; and
   forming a stack of piezoelectric layers, the one or more coated surfaces substantially parallel to a reflective surface of the mirror.

2. The method of claim 1 wherein the void has a perimeter larger in diameter than a diameter of an area of the mirror which may be impinged by a beam.

3. The method of claim 1, wherein the piezoelectric layers have voids corresponding to the electrode material voids, and further comprising:
   bonding a non-piezoelectric stiffening block to the mirror, the non-piezoelectric stiffening block in the voids and above an area of the mirror which may be impinged by a beam.

4. The method of claim 3, wherein the non-piezoelectric stiffening block is bonded to a non-reflective surface of the mirror.

5. The method of claim 1, wherein forming the piezoelectric layers are configured to not include a void corresponding to the void of the electrode material.

6. A piezoelectric transducer configured to limit an amount of induced mirror curvature during operation of a piezoelectric device bonded to the mirror defined by a reflective surface and a non-reflective surface, the piezoelectric transducer comprising:
   a plurality of stacked piezoelectric devices substantially parallel to the reflective surface of the mirror, with least one piezoelectric device attached to a periphery region of the mirror and formed with a void within a central region of the piezoelectric device;
   an electrode material coating a surface of the at least one piezoelectric device, the electrode material having a void formed therein adjacent the central region of the at least one piezoelectric device; and
   a non-piezoelectric stiffening block residing in the void with an end bonded to a central region of the non-reflective surface of the mirror,
   wherein the non-piezoelectric stiffening block is operable to limit a curvature of the central region of the mirror during operation of the piezoelectric transducer.

7. The piezoelectric transducer of claim 6, wherein an opposing surface of the at least one piezoelectric device with the void is bonded to the periphery region of the mirror.

* * * * *